United States Patent
Rao et al.

(10) Patent No.: US 11,665,407 B2
(45) Date of Patent: *May 30, 2023

(54) SYSTEMS AND METHODS FOR CREATING VARIABLE LENGTH CLIPS FROM A MEDIA STREAM

(71) Applicant: SLING MEDIA L.L.C., Foster City, CA (US)

(72) Inventors: Padmanabha R. Rao, Palo Alto, CA (US); Brian J. Griffin, Brooklyn, NY (US); Jason Hirschhorn, New York, NY (US); Brian Lucas, Foster City, CA (US); Sean Curtis, Rockville Centre, NY (US); Frank Conway, Little Falls, NJ (US)

(73) Assignee: Sling Media L.L.C., Foster City, CA (US)

( * ) Notice: Subject to any disclaimer, the term of this patent is extended or adjusted under 35 U.S.C. 154(b) by 641 days.

This patent is subject to a terminal disclaimer.

(21) Appl. No.: 15/979,370

(22) Filed: May 14, 2018

(65) Prior Publication Data
US 2018/0262818 A1 Sep. 13, 2018

Related U.S. Application Data

(63) Continuation of application No. 12/347,465, filed on Dec. 31, 2008, now Pat. No. 9,998,802, which is a
(Continued)

(51) Int. Cl.
*H04N 21/2743* (2011.01)
*H04N 21/234* (2011.01)
(Continued)

(52) U.S. Cl.
CPC ........... *H04N 21/835* (2013.01); *G11B 27/00* (2013.01); *H04L 65/4015* (2013.01);
(Continued)

(58) Field of Classification Search
CPC ........ H04N 21/835; H04N 7/00; H04N 7/165; H04N 7/173; H04N 21/23424;
(Continued)

(56) References Cited

U.S. PATENT DOCUMENTS 6,125,259 A * 9/2000 Perlman .................... H04N 5/44
348/E7.06
8,238,718 B2 * 8/2012 Toyama ............... G11B 27/034
386/243

(Continued)

OTHER PUBLICATIONS

Sangok Kim, Kanghee Lee, Zhefan Jiang, Hyunchul Bae and Sangwook Kim, "Streaming player support protocol adaptation and independent operating system," Fourth Annual ACIS International Conference on Computer and Information Science (ICIS'05), 2005, pp. 194-197, doi: 10.1109/ICIS.2005.116 (Year: 2005).*

*Primary Examiner* — Pinkal R Chokshi
(74) *Attorney, Agent, or Firm* — KW Law, LLP

(57) ABSTRACT

Systems and methods are described for providing variable-length media clips based upon a received media stream. An exemplary system for providing media clips to users includes a database comprising a list of rules associated with a plurality of programs, as well as a first server and a second server. The first server receives information about a particular program being viewed by a media player and obtains rules from the database for the identified program that are transmitted to the media player. The second server receives a media clip of the particular program being viewed from the media player, wherein the media clip is created at the media player in accordance with the rules corresponding to the program, and subsequently makes the media clip available to the users.

12 Claims, 6 Drawing Sheets

Related U.S. Application Data continuation-in-part of application No. 11/620,711, filed on Jan. 7, 2007, now Pat. No. 8,346,605.

(60) Provisional application No. 61/019,232, filed on Jan. 4, 2008.

(51) Int. Cl.

| | | |
|---|---|---|
| *G11B 27/00* | (2006.01) | |
| *H04N 21/835* | (2011.01) | |
| *H04N 7/00* | (2011.01) | |
| *H04N 7/16* | (2011.01) | |
| *H04N 7/173* | (2011.01) | |
| *H04N 21/254* | (2011.01) | |
| *H04N 21/4627* | (2011.01) | |
| *H04N 21/472* | (2011.01) | |
| *H04N 21/4788* | (2011.01) | |
| *H04N 21/81* | (2011.01) | |
| *H04N 21/8355* | (2011.01) | |
| *H04L 65/401* | (2022.01) | |
| *H04L 65/75* | (2022.01) | |

(52) U.S. Cl.
CPC .............. *H04L 65/765* (2022.05); *H04N 7/00* (2013.01); *H04N 7/165* (2013.01); *H04N 7/173* (2013.01); *H04N 21/23424* (2013.01); *H04N 21/2541* (2013.01); *H04N 21/2743* (2013.01); *H04N 21/4627* (2013.01); *H04N 21/4788* (2013.01); *H04N 21/47205* (2013.01); *H04N 21/812* (2013.01); *H04N 21/8355* (2013.01)

(58) Field of Classification Search
CPC ........... H04N 21/2541; H04N 21/2743; H04N 21/4627; H04N 21/47205; H04N 21/4788; H04N 21/812; H04N 21/8355; H04L 65/605; H04L 65/4015; G11B 27/00; G11B 27/031
See application file for complete search history.

(56) References Cited

U.S. PATENT DOCUMENTS

| | | | |
|---|---|---|---|
| 2003/0182579 A1* | 9/2003 | Leporini | H04N 21/4623 |
| | | | 713/150 |
| 2004/0205816 A1* | 10/2004 | Barrett | H04N 21/4312 |
| | | | 348/E7.054 |
| 2006/0066755 A1* | 3/2006 | Kowald | H04N 21/4312 |
| | | | 715/788 |
| 2007/0053513 A1* | 3/2007 | Hoffberg | G06K 9/00369 |
| | | | 380/201 |
| 2007/0300269 A1* | 12/2007 | Roberts | H04N 21/6125 |
| | | | 725/88 |

* cited by examiner

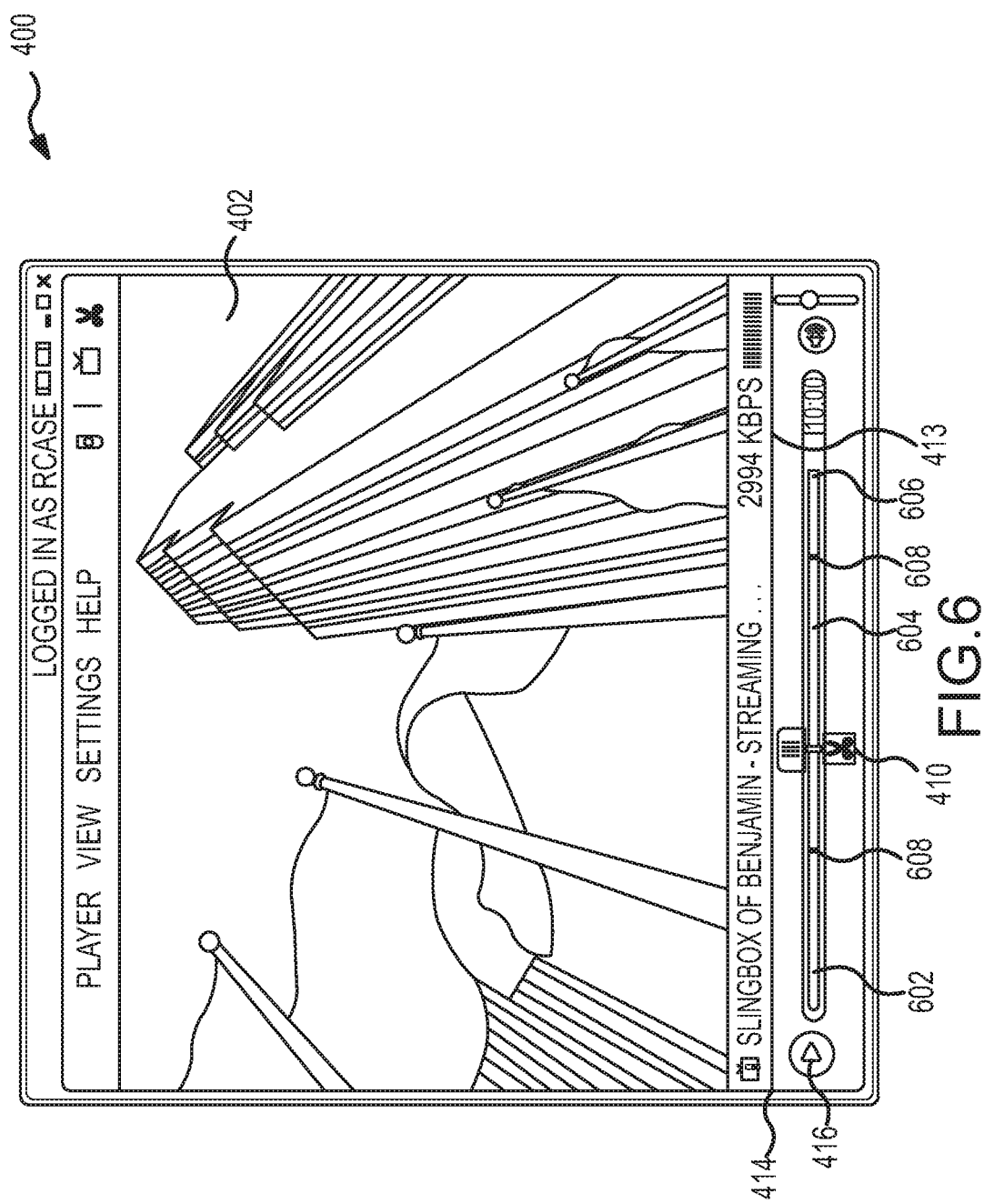

SYSTEMS AND METHODS FOR CREATING VARIABLE LENGTH CLIPS FROM A MEDIA STREAM

PRIORITY CLAIM

This application is a continuation of U.S. patent application Ser. No. 12/347,465 filed on Dec. 31, 2008, which claims the benefit of U.S. Provisional Application Ser. No. 61/019,232, filed on Jan. 4, 2008 and is a continuation-in-part of U.S. patent application Ser. No. 11/620,711, which was filed on Jan. 7, 2007. The '711 application claims the benefit of U.S. Provisional Application No. 60/823,066, filed on Aug. 21, 2006 and is also a continuation-in-part of U.S. application Ser. No. 11/147,664, filed on Jun. 7, 2005, which claims the benefit of U.S. Provisional Application No. 60/577,833, filed Jun. 7, 2004.

All of these applications are incorporated herein by reference in their entirety.

TECHNICAL FIELD

The following discussion generally relates to creating media clips from a received media stream.

BACKGROUND

Consumers are continually demanding increased flexibility in viewing television and other forms of media. Whereas television viewing traditionally involved watching imagery received on a broadcast signal on a conventional television set, modern media experiences allow media content to be provided via broadcast, cable, satellite, portable media (e.g., DVD) and other sources. Further, the Internet and other relatively high-bandwidth networks now allow media content to be delivered to any number of devices (e.g., wireless phones, computers and the like) that previously were not typically used for viewing media content. Such networks have also allowed viewers to "place shift" their media experience from their home television or the like to a remotely-located television, computer, wireless telephone or other device. Consumers are therefore able to view television and other media content on a wide variety of devices and in a wide variety of locations.

In addition to the increased availability and flexibility in viewing media content, consumers have recently expressed significant interest in creating "clips" of media content that can be shared with others. Such clips may include relatively short excerpts of viewed media content in a digital or other format that may be distributed via the Internet or another channel; a number of Internet services for uploading and sharing media clips have become very popular in recent years. A challenge continues, however, in allowing users to create clips of popular media content while protecting the content owner's rights in the media.

As a result, it is desirable to create systems, methods and/or devices that are able to allow consumers to create clips of received media content and to share these clips in a manner that respects the rights of the content owner. These and other desirable features and characteristics will become apparent from the subsequent detailed description and the appended claims, taken in conjunction with the accompanying drawings and this background section.

BRIEF DESCRIPTION

According to various exemplary embodiments, systems and methods are described for providing variable-length media clips based upon a received media stream. An exemplary system for providing media clips to users includes a database comprising a list of rules associated with a plurality of programs, as well as a first server and a second server. The first server receives information about a particular program being viewed by a media player and obtains rules from the database for the identified program that are transmitted to the media player. The second server receives a media clip of the particular program being viewed from the media player, wherein the media clip is created at the media player in accordance with the rules corresponding to the particular program, and subsequently makes the media clip available to the users.

In other embodiments, a method for processing a media clip suitably comprises receiving information about a particular program being viewed by a remotely-located media player, obtaining at least one rule corresponding to the particular program, wherein the at least one rule regulates clipping of the particular program, and providing the at least one rule corresponding to the identified particular program to the remotely-located media player to thereby allow the remotely-located media player to create a clip of the particular program in accordance with the at least one clipping rule.

In still other embodiments, a method of creating a variable length media clip from a media stream suitably comprises receiving a media stream at a media player device, obtaining a maximum clip length associated with the program, receiving a start point and an end point of the variable length media clip while maintaining the length of the variable length media clip to be less than the maximum clip length, and providing the created clip to a remote server.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a diagram of an exemplary media clipping system;

FIGS. 4-6 are exemplary interfaces for an exemplary media player application that is capable of creating variable-length media clips.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

According to various exemplary embodiments, systems and techniques are provided for creating variable-length media clips from a media stream that is received at a media player. The player is able to provide information about the received media stream or a program that is currently being viewed to a remotely-located server to obtain one or more rules relating to the creation of media clips. The rules may include, for example, a maximum allowable clip length, as well as any limitations on displaying or distributing the clip, that are determined based upon the program name, network or other particular information that is the source of the clip. Other rules could restrict clip quality or other parameters, and/or may restrict other actions such as whether clip may be recorded or not, or the like. Any number of different rules could be formulated and applied as desired. The media player creates the clip in accordance with the received rules, and provides the clip to a distribution server for distribution or sharing with other users. In various embodiments, any limitations on display or distribution of the clip may be contained within metadata associated with the clip itself to thereby allow the distribution server to implement the rules for the particular clip.

Figure 1:
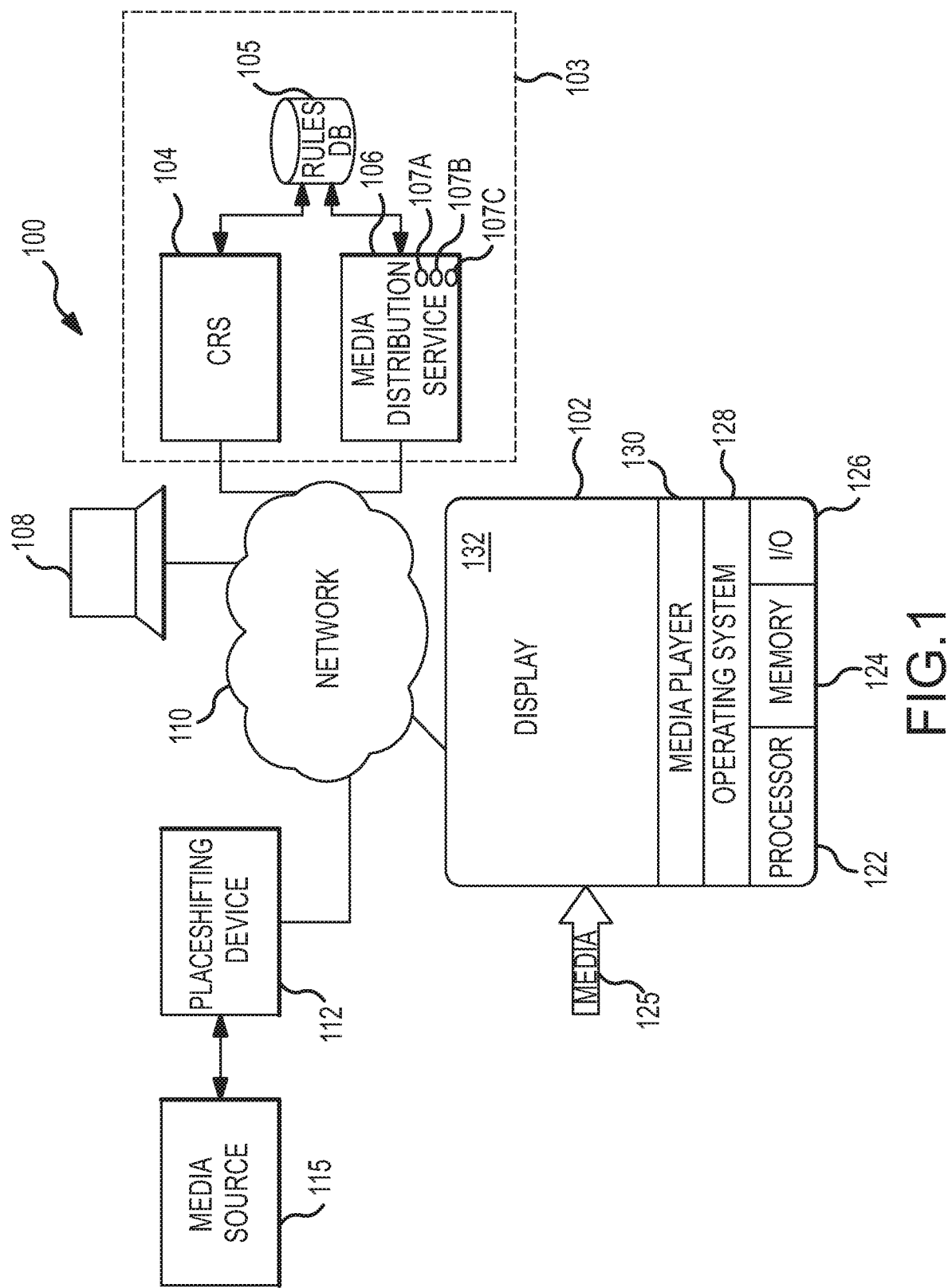

With initial reference to FIG. 1, an exemplary system 100 for creating and distributing a media clip 107A-C suitably includes a media player device 102 that receives a media stream 125 from any source and creates clips 107A-C in accordance with rules stored in a database 105. Media player 102 suitably obtains the rules associated with the particular program or network being "clipped" from a clipping rights server (CRS) 104 that is remotely-located across a network 110. Clips 107A-C created in accordance with the received rules can be distributed (also in accordance with the rules associated with the particular program) via media distribution server 106. By identifying the particular program or network from the source media stream 125 prior to clip creation and then applying clip creation and distribution rules that are unique to the program and/or network, the rights of the media content owner can be preserved while still providing great flexibility to viewers in creating clips of viewed content.

Media player 102 is any device, system or module capable creating a media clip 107A-C from a received media stream 125. In various embodiments, media player 102 is implemented with any sort of conventional computer system or similar workstation, such as any sort of desktop, laptop or other personal computer or general-purpose computing system. In other embodiments, media player 102 is a set-top box (STB) or other receiver device capable of receiving television or other media signals via any sort of broadcast, cable, satellite or other medium. In still other embodiments, media player 102 may be a portable self-contained computing device such as any sort of wireless phone, personal digital assistant (PDA), network client and/or the like. Alternatively, media player 102 is a logical application or other module implemented in software or firmware that can be executed on any sort of processing hardware, including any sort of web or other network server. Media player 102 therefore includes any sort of hardware, software, firmware and/or other resources that allow for creation of clips 107A-C from a received media stream 125.

Media stream 125 is received from any source, and in any format. In embodiments wherein media player 102 is a television receiver such as a STB, for example, media stream 125 may be received directly from a satellite, cable, broadcast or other source. In such embodiments, media stream 125 may be a received television signal or the like that is received and processed locally on media player device 102. Media stream 125 may also represent a stream obtained from a DVD or other portable medium, and/or a media file stored at media player 102 in any format.

Other embodiments of media player 102 may also support streaming media placeshifting over a digital network 110. In various embodiments, consumers may wish to placeshift content within a home, office or other structure, for example, such as from a placeshifting device 112 to a media player 102 located in another room, or to a remotely located media player 102 located in a second home, office, hotel or other remote location. Although placeshifting may traverse any local, wide area, telephone and/or other networks no to provide media stream 125 from any placeshifting source 112 to any destination media player 102, as described more fully below, media stream 125 may be obtained from any local or remote source available to media player 102. Similarly, media player 102 may itself provide placeshifting functionality; that is, some embodiments of media player 102 may additionally incorporate the features of placeshifting device 112 into a common system. A set-top box or other television receiver that provides placeshifting features, for example, could receive media stream 125 from any local or remote source. This media stream 125 may be clipped or otherwise processed locally at the receiver, and/or may be placeshifted for viewing at any remote location. Again, placeshifting is not required in all embodiments.

Media player 102 as described herein therefore equivalently represents any device, logic or other system capable of receiving a media stream 125 from any local or remote source and of creating a media clip from the received content. In embodiments wherein media player 102 is a conventional STB or similar receiver, media stream 125 may be a satellite, cable or broadcast stream that is presented on a television or other local display 132, and that is clipped or otherwise processed in response to inputs provided by a user via a remote control or other input device as appropriate. While other embodiments may provide clipping in the context of a media stream that is place shifted across network 110, placeshifting is not required in all embodiments. Media player 102, then, may equivalently represent a conventional STB or other television receiver, as well as any sort of media player application or device capable of receiving placeshifted media streams from any source.

In the exemplary embodiment shown in FIG. 1, media player 102 includes a processor 122, memory 124 and input/output features 126 commonly associated with any conventional computing platform. Processor 122, for example, may be any sort of microprocessor, microcontroller, digital signal processor, programmable array or other logic capable of executing instructions and processing data to implement the various features of the media player device. Memory 124 includes any sort of RAM, ROM, flash and/or other memory capable of storing instructions and data that can be processed by processor 122 or other processing logic as appropriate. Input/output 126 typically includes any conventional interfaces to input devices (e.g., keyboard, mouse, touchpad, wireless or other remote control, or other input devices as appropriate), as well as any conventional interfaces to output devices such as a display 132 or the like. Input/output 126 typically also includes interfaces to any sort of mass storage (e.g., a magnetic or optical disk) and/or to a communications network 110. Network interfaces used in various embodiments might include any sort of wired (e.g., ETHERNET) or wireless (e.g., IEEE 802.11 "Wi-fi") interfaces, including any sort of interfaces to telephone networks.

Any of the various features of media player 102 may be implemented with any sort of general or special purpose hardware, software and/or firmware, as appropriate. In some embodiments (e.g., embodiments wherein media player 102 is implemented as a STB or other media receiver), processor 122, memory 124 and/or input/output 126 may be implemented as a "system on a chip" (SoC) using any suitable processing circuitry under control of any appropriate control logic. In various embodiments, such control logic may execute within an integrated SoC or other processor to implement a media receiver, decoder, display processor and/or any other features as appropriate. The Broadcom Corporation of Irvine, Calif., for example, produces several models of processors (e.g., the model BCM 7400 family of processors) that are capable of supporting SoC implementations of satellite and/or cable receiver systems, although products from any number of other suppliers could be equivalently used. In still other embodiments, various distinct chips, circuits or components may be inter-connected and inter-relate with each other to implement the various functions and features described herein.

To that end, operations of device 102 may be controlled by any sort of general purpose or other operating system 128. Operating system 128 typically implements user interface features and also allows programs (e.g., media player application 130) to use the various hardware and other resources of device 102. Examples of operating systems that could be used in various embodiments include any of the well-known operating systems conventionally used in personal computing (e.g., any version of WINDOWS, MacOS/OSX, LINUX OS, etc.) or mobile computing (e.g., Blackberry OS, ANDROID OS, WINDOWS MOBILE, SYMBIAN OS, iPHONE OS, etc.). The particular examples of operating systems are not intended to be limiting; indeed, other embodiments could be based upon other operating systems, including any sort of proprietary operating system, and equivalent embodiments could be based upon any sort of programming or other abstraction environment (e.g., JAVA, .NET, and/or the like) in place of or in addition to a conventional operating system 128.

Media player application 130 is any program, application, applet, browser plugin, software module and/or other logic capable of processing the received media stream 125 to create one or more media clips 107A-C. In various embodiments, media player application 130 also contains decoder functionality for decoding the received stream 125 for playback on display 132 or the like. Media player application 130 may be implemented in any programming language, and may be stored in source or object code format in any storage medium, including memory 124 and/or any sort of disk or other mass storage available to media player 102. In an exemplary implementation, media player application 130 is a software program that is stored in object code form on a disk or similar medium until being activated by the user. The program 130 is then partially or wholly duplicated into memory 124 to facilitate execution of the object code instructions by processor 122. Examples of various interfaces that might be provided by one implementation of media player application 130 are described below with reference to FIGS. 4-7, although any other interfaces could be used in alternate embodiments.

Display 132 is any sort of television, monitor or other display capable of presenting imagery to the viewer. In various embodiments, display 132 is a conventional television or computer monitor associated with media player 102, including any sort of integrated or external display 132 that might be associated with a computer, wireless phone, PDA or the like. In other embodiments, display 132 is a conventional analog or digital television that may be coupled to a STB or other receiver 102, as described above. Display 132 need not be physically present at the same location as media player 102 in all embodiments; to the contrary, content may be provided from media player 102 to display 132 via any sort of cabling, network (e.g., network 110) or the like.

Network no is any digital or other communications network capable of transmitting messages between senders and receivers. In various embodiments, network no may encompass one or more wide area networks, local area networks, and/or any combination of wide and local area networks, including any sort of wireless or other telephone networks. Network 110 can include any number of public or private data connections, links or networks supporting any number of communications protocols. Network no may include the Internet, for example, or any other network based upon TCP/IP or other conventional protocols. In many embodiments, network no may also include one or more conventional local area network, such as one or more IEEE 802.3 and/or IEEE 802.11 networks. Network 110 as shown in FIG. 1, then, is intended to broadly encompass any digital communications network(s), systems or architectures for transmitting data between the various components of system 100.

As noted above, in some embodiments media player 102 receives media stream 125 over network no from one or more placeshifting devices 112. In such embodiments, placeshifting device 112 packetizes media content received from a media source 115 for transmission over communications network 110. The media source 115 may include any source of media content, including any sort of digital or analog recording device (e.g., a digital video recorder); any broadcast, cable or satellite television programming source; any "video-on-demand" or similar source; a player for any sort of digital video disk (DVD) or other removable media; a security or other video camera; and/or the like. When present, then, placeshifting device 112 is any component, hardware, software logic and/or the like capable of transmitting a packetized stream of media content over network 110. Although FIG. 1 shows only a single placeshifting device 112, in practice system 100 may include any number of placeshifting devices 112 and/or media sources 115, each of which may be able to stream media content to media player 102. Again, placeshifting is not necessary in all embodiments.

In embodiments that do provide placeshifting, media data may be received from the controlled source 115 in any format. Each placeshifting device 112 therefore incorporates suitable transcoder logic to convert audio/video or other media data into a packetized format (e.g., MPEG, QuickTime, Windows Media and/or the like) that can be transmitted over network 110 as stream 125. Placeshifting device 112 may also provide control instructions to one or more media sources 115 using any sort of infrared, radio frequency, or other signals. Such signals may be provided, for example, from an "IR Blaster" or similar feature that emulates infrared or other RF instructions provided from a remote control associated with the media source 115. Control signals and response could be equivalently transferred over a home network or other data connection, or alternatively via USB and/or any other sort of hardwired cable connection. U.S. Patent Publication No. 2006/0095471 describes one example of a placeshifting encoder, although the concepts described herein could be used in conjunction with products and services available from any source, including those available from Sling Media of Foster City, Calif. and others.

As noted above, it is generally desirable to allow viewers to create clips from media stream 125 that can be shared with other viewers, provided that the rights of the content owner can be protected. In various embodiments, media player 102 communicates with a data center system 103 that provides clipping rules associated with the particular program or network contained within media stream 125 to allow such clipping to occur. Data center system 103 as shown in FIG. 1 includes a database 105, a clip rules server ("CRS") 104, and a media distribution server 106 as appropriate. Servers 104 and 106 may implemented using any sort of conventional network server hardware. Various embodiments of system 103 may also include redundant servers for CRS server 104 and/or media distribution server 106, as well as appropriate backup, load balancing, security and other features conventionally found in a typical web service system.

Database 105 includes any sort of data collection or repository that associates clipping rules with particular programs, channels and/or networks, as well as any sort of database engine or the like that allows access to the data. In various embodiments, database 105 is implemented with any sort of conventional relational, hierarchical, object-oriented or other database structure that may be organized in any manner. Database 105 typically includes any number of entries corresponding to particular programs and/or networks as appropriate. Rules associated with any particular program or networks may include rules related to clip sharing, clip distribution, clip display, and/or the like. Clip sharing rules may include, for example, rules setting forth whether clipping is allowed or not allowed, a maximum clip length, a portion of a program wherein clipping is blocked, and/or other rules as desired. Clip distribution rules may include limits on whether the clip may be shared or not, as well as any limits on the parties that may receive the clip (e.g., everyone, registered members, friends of the clip maker, etc.). Clip display rules may include temporal or other restrictions on the availability of the clip (e.g., blocking clips for a particular program until a certain time). Such features may be beneficial, for example, in preventing clips of a program initially broadcast in a more easterly time zone (e.g., EST) from being viewed until the same program has been broadcast in a more westerly time zone (e.g., PST or Hawaii-Aleutian Time). Time limits could also be imposed to prevent clipping from an original broadcast, but to allow clipping from DVR recordings or the like after an appropriate period of time has elapsed after the original broadcast. Other rules may restrict the number of users who have access to a particular clip, the quality of clips that can be created (e.g., any limits on resolution, bit or frame rate, or any other parameter), limits on further copying, displaying, editing or the like, and/or any other limitations as desired. Rules may be formulated with regard to any aspect of clip creation, display, processing, distribution and/or the like.

As noted above, rules may be associated with particular programs, networks, channels and/or other features as desired. In various embodiments, rules can be associated with particular programs to allow clipping according to certain constraints for the particular program. Clipping may be blocked entirely for some programs, for example, while clipping may be allowed, or allowed with constraints, for others. Clipping rules may also be described for entire channels or networks, if desired. In such embodiments, a set of clipping constraints can be defined for all of the programs appearing on that channel or network. Further, rules may be defined that incorporate both program name and a channel or network, if desired. Such rules may allow block clipping of new episodes of a program, for example, while allowing clipping of older episodes that may be running in syndication on another channel or network. Rules may be created to facilitate any sort of licensing or other business arrangement with the content owner in any convenient manner.

CRS server 104 is any system, component or logic capable of receiving queries from one or more media players 102 and of returning one or more rules from database 105 in response. In various embodiments, CRS server 104 receives information about the media stream 125 currently being received by a particular media player 102 and obtains the particular rules from database 105 that are associated with the particular program or network. These rules can then be provided back to media player 102 to allow or disallow clipping according to the defined rules for that particular program, network and/or channel.

Media distribution server 106 is any system, component or logic capable of receiving media clips 107A-C from one or more media players 102 and of providing access to the various clips for other users of system 100. In various embodiments, media distribution service is implemented using conventional network server hardware (including any desired redundancy, load balancing, backup and the like) for providing access to files via network 110. Media distribution server 106 is further configured, however, to implement various rules regarding the distribution and/or display of particular clips. These rules may be received directly from database 105 in some embodiments. In other embodiments, the particular rules implemented by the media distribution server 106 are received as metadata contained within the clips 107A-C themselves.

Distribution and display of media clips 107A-C may take place in any manner. Clips 107A-C may be provided in a streaming format, for example, or may be provided in a file-based format that would allow users to download and save local copies of the clip 107A-C. In various embodiments, the type of downloading or presentation may be restricted or otherwise determined using rules obtained from server 105.

Clips 107A-C uploaded to server 106 may be accessed in any manner. In various embodiments, one or more users (e.g., a user of computer system 108) can access one or more clips 107A-C via network 110 using a conventional browser program or the like. Server 106 may implement any sort of account management scheme (e.g., based upon userid/password combinations or other credentials), or public access to some or all clips 107A-C may be allowed. Users may be directed toward particular clips in any manner. A search engine that allows keyword searching or searching based upon program name, network, channel, actor/actress name or the like may be provided. In various embodiments, a user creating a clip 107A-C may be able to forward an email or other message to one or more other users that includes a link (e.g., a uniform resource locator (URL)) or other identifier for the particular clip 107A-C.

To create a clip 107A-C from a received media stream 125, then, media player 102 suitably obtains one or more clip rules associated with the particular program or network being viewed from CRS server 104. The rule may include, for example, a maximum clip length allowed for the particular program or network. The media player 102 then allows the viewer to create a clip that is within the constraints of the received rules for the particular program, and to upload the clip 107A-C to server 106 for distribution to others within the further constraints of the rules established by the content owner. By providing rules associated with the particular program or network that is the source material for the clip 107, the rights of the content owner can be protected while still providing flexibility in allowing significant flexibility in creating and distributing media clips 107A-C. Additional detail about an exemplary process for creating a clip 107A-C is described with reference to FIG. 2, and other embodiments may be modified and/or enhanced in any number of ways.

Figure 2:
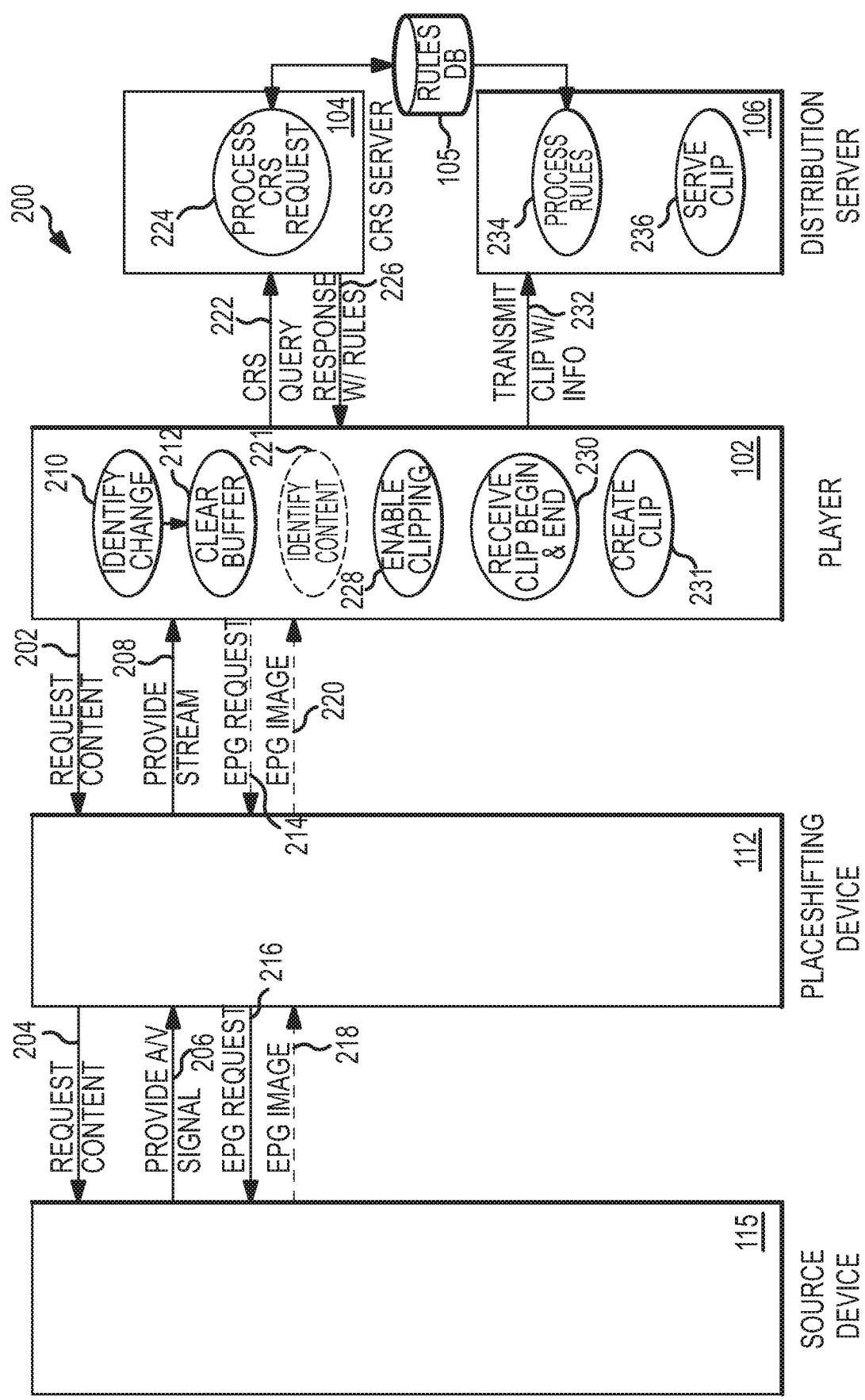
FIG. 2 is a data flow diagram of an exemplary media clipping process and system.

With reference now to FIG. 2, an exemplary process 200 for creating a video clip 107 suitably involves gathering information about the media stream (step 210), obtaining rules associated with the program or network from WIO server 104 based upon the gathered information, and creating and distributing the clip 107 within the constraints of the received rules.

Content 125 may be received at media player 102 in any manner. In the exemplary embodiment shown in FIG. 2, content is received at media player 102 from a remotely-located placeshifting device 112, as described above. In such embodiments, content is initially received in response to a request 202 that is placed from the player 102 to placeshifting device 112 (e.g., over network no). Placeshifting device 112 provides infrared or other instructions 204 to a controlled device 115 (e.g., a DVR or receiver) to obtain the requested content. This content is provided as an audio/visual signal 206 to placeshifting device 112, which in turn transcodes or otherwise processes the received data to create a media stream 125 that can be provided 208 to media player 102 as desired. Other embodiments, however, may obtain media stream 125 from any other local or remote source other than placeshifting device 112, as described more fully above. That is, many equivalent embodiments could simply receive media stream 125 from a local receiver (e.g., a satellite, cable or broadcast receiver) as part of a STB or the like, without the need to obtain media stream 125 from a remote source such as devices 112 or 115. In such embodiments, functions 202-208 may not be needed or present, as content 125 is simply received from a broadcast or other locally-received source.

After being received from any local or remote source, the contents of media stream 125 may be temporarily stored in any manner. In various embodiments, media player application 130 (FIG. 1) provides a buffer that allows for temporary storage of media stream 125 to facilitate pausing, rewind, fast forward (within the limits of available content) and other features as appropriate. Generally speaking, the contents of the buffer are used to create any media clips 107A-C associated with the received stream 125. This buffer is generally cleared 212 upon initialization of media player application 130 and/or upon a change 210 in media stream 125. The change may be, for example, switching to a different media source, changing to a different channel or network, selecting a different program from a DVR or other recording device, or the like.

After a startup or change in media stream 125, media player 102 identifies the content of the media stream 125 in any manner (step 221 in FIG. 2). In some embodiments, identifying the content may be as simple as retrieving program, channel and/or network identification information from an electronic program guide (EPG) associated with media player 102, placeshifting device 112 and/or controlled device 115. Various EPG implementations are populated with data from any source (e.g., Tribune Media Services (TMS) of Chicago, Ill.) that may include identification information (e.g., program title, network name, channel name or number, identification codes or the like) in a textual or other convenient format that can be used to identify the particular program, channel or network. If EPG data is available to media player 102, then, information about the media stream 125 may be readily ascertained from such data.

Embodiments and situations may arise, however, in which media player 102 does not have current EPG information or is otherwise not able to directly obtain information about the content of media stream 125. In such embodiments, it may be desirable to generate an image within stream 125 itself that includes identifying information. This may be accomplished, for example, by generating a program guide window within the received stream 125. In the exemplary placeshifting embodiment shown in FIG. 2, media player 102 transmits an EPG request message 214 to placeshifting device 112, which in turn instructs the controlled device 115 to generate the EPG image. Placeshifting device 112 may transmit such an instruction 216 via an infrared blaster, for example, or any other link used to control device 115. In such embodiments, device 115 appropriately displays a program guide window 218 that can be transcoded or otherwise provided 220 to player 102 as part of media stream 125.

Media player 102 may then process the received EPG imagery in any manner to extract textual or other information about the media stream 125. In various embodiments, media player 102 implements an optical character recognition (OCR) feature that recognizes alphanumeric or other characters contained within the EPG imagery. This OCR feature may be implemented locally at media player 102 in some embodiments, or may be performed by a remotely-located server, such as any OCR server associated with data center system 103. In various embodiments, imagery from media stream 125 may be transmitted to CRS server 104 (or another "what is on" (WIO) server, if available) for identification of the program currently being viewed, as described more fully below.

Media player 102 suitably transmits 222 any available identifying information about media stream 125 to WIO server 104 to obtain a response 226 that includes any clipping rules that may be available for the particular program, channel or network being viewed. Information provided in request 222 may include EPG information, if available, and/or EPG imagery as appropriate. Other embodiments may provide any other information (e.g., channel number) that can be used to determine the currently-viewed program from other information that may be known to CRS server 104 (e.g., physical location of media player 102, date and time, etc.).

CRS server 104 processes query 222 in any manner (step 224). If the query does not already contain identifying information about the program, CRS server 104 may appropriately identify the program, channel and/or network of the currently-received media stream 125 in any manner from any sort of available information. Any rules associated with the identified program can then be retrieved from database 105, as described above, and returned to media player 102 as response 226. In various embodiments, response 226 includes at least an indication as to whether clipping is allowed for the identified program, and may also include the maximum length for any allowed clips. In some embodiments, response 226 may indicate that clipping is not available by simply indicating a maximum clip length of zero (or another pre-determined value). Response 226 may also include any additional rules relating to distribution or display of clips 107A-C made from the identified program, as desired. In various embodiments, response 226 may also include rules associated with programs that may be reasonably expected to follow the current program in the media stream (e.g., rules for the next program being broadcast on the same channel or network as the current program), as desired.

Upon receipt of response 226, media player 102 may enable clipping 228 as appropriate. Various techniques for processing a video clip, including determining a suitable beginning and end (step 230) for the clip, are described in conjunction with FIGS. 4-7 below. Generally speaking, the beginning and end of the clip are maintained within the confines of a current program in most embodiments (e.g., clips may not typically contain content from more than one program), and the beginning and end are constrained to remain within the allotted maximum clip length for the generated clip 107A-C.

Clip 107 may be created in any manner (step 231). In various embodiments, decoded content from media stream 125 that is present within the buffer is simply encapsulated within appropriate framing to allow subsequent processing and/or transport across network no. In other embodiments, the decoded content may be further compressed, transcoded or otherwise processed to place the clip 107 into a format that is more suitable for transport or viewing over network no. Further, in various embodiments, at least some of the rules received in response 226 may be included in metadata or other formatting associated with clip 107. Such metadata may also include any identifying information about the clip, including any EPG information, start/end times, identifying information received in response 226, and/or any other information as appropriate.

The created clip 107 is then transported 232 to distribution server 106 in any appropriate manner. Clip 107 may be transported using a conventional file transfer protocol, for example, or any other protocols as desired. The clip is received and processed at distribution server 106 to perform any additional transcoding, compression or other modifications that may be desired, and to ensure compliance with the remaining rules associated with the source material for clip 107. As noted above, the rules for distribution, display and/or the like may be obtained from metadata associated with the clip itself, or may be retrieved from database 105 using any available identifying information about media clip 107. The received, formatted and processed clip 107 may then be provided to other users (e.g., users on network no) within the constraints of any rules associated with the clip or its content source.

Figure 3:
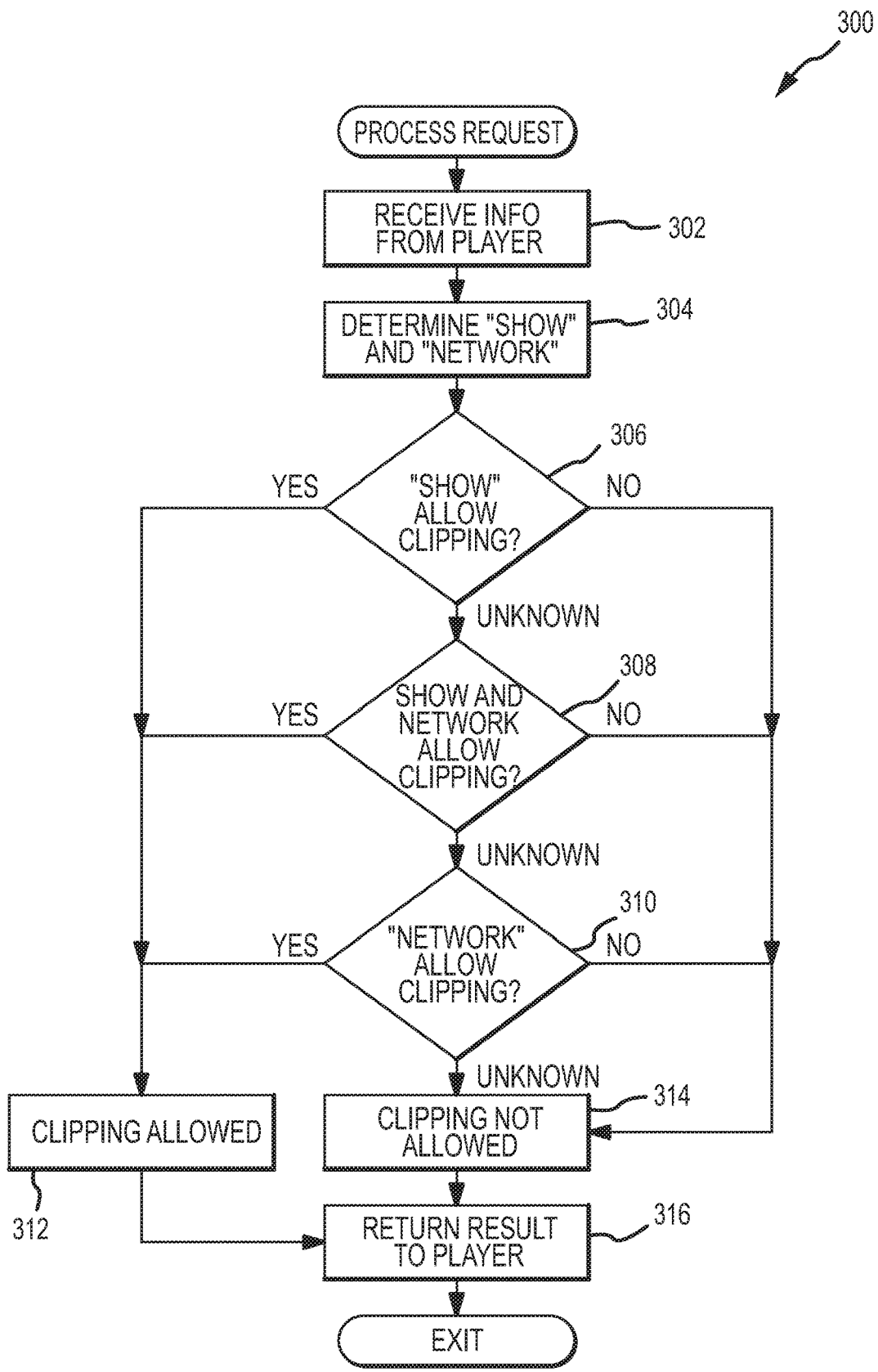
FIG. 3 is a flowchart of an exemplary technique for identifying rules associated with a particular program or network.

Turning now to FIG. 3, an exemplary process 300 that may be executed at CRS server 104 and/or database 105 suitably involves the broad steps of receiving a request 222 containing information about a particular program being viewed by a remotely-located media player 102 (step 302), identifying the program being viewed by the remotely-located media player from the information (step 304), obtaining one or more rules corresponding to the identified particular program from the database 105 (steps 306-314), and providing a response 226 to the remotely-located media player that includes the rules corresponding to the identified program. Generally speaking, each of the method steps shown in FIG. 3 may be implemented in software or firmware that may be stored in memory, mass storage or any other storage medium available to the executing device, and that may be executed on any processor or control circuitry associated with the executing device. The particular logic shown in FIG. 3 may be modified or enhanced in any manner, and any other components, systems, logic or devices may be involved in various other embodiments as appropriate.

As noted above, process 300 begins by WIO server 302 and/or database 105 receiving request 222 from a remotely-located media player 102. The request may be received in any format (e.g., a TCP or UDP format) over network no, or any other communications link. Request 222 will typically contain some sort of identifying information about the media stream 125, such as information obtained from an EPG, EPG image or other source as described more fully above.

The program currently processed by media player 102 may be identified in any manner (step 304). Generally speaking, step 304 involves identifying a show name and network in any manner. Such information may be obtained, for example, from media player 102 itself, from the media source, from a separate WIO Server, and/or any other information source as desired. In various embodiments, the information received in request 222 may be sufficient to identify the program itself with little or no additional processing. Such embodiments may provide, for example, TMS program and/or station identification codes that can be readily correlated to a show name and/or network name, respectively. In other embodiments, OCR processing may be obtained (or performed directly) to extract textual information that can be used to identify the program, as described more fully above. Various other embodiments may identify the program and/or network being viewed in any manner.

The obtained "show name" and "network" (or channel) information may then be used to obtain desired clipping rules in any manner. In many embodiments, CRS server 104 posits a query to database 105 to determine whether the show name and/or network correspond to any valid entries that include clipping rules (steps 306, 308, 310). In general, if the show name and/or network can be recognized in database 105, then clipping rules allowing (step 312) or denying clipping (step 314) can be obtained. In many embodiments, clipping will not be allowed if the program or network are not identifiable to conservatively protect the rights of content owners. Other embodiments could be readily configured to allow clipping by default, however, or to allow clips of a restricted length, quality or the like. As noted above, clipping rules may be created for particular programs (step 306), networks (308), channels (not shown) and/or combinations of program name/channel/network (step 310) to allow for flexibility in applying different clipping rules in different programming situations.

After any clipping rules are obtained, a response 226 is provided to media player 102 as appropriate (step 316). As noted above, response 226 may include any number of rules, including any rules relating to clip distribution and display. Clipping rules may be changed at any time by updating the CRS server 104 and/or the database 105, as desired.

Figure 4:
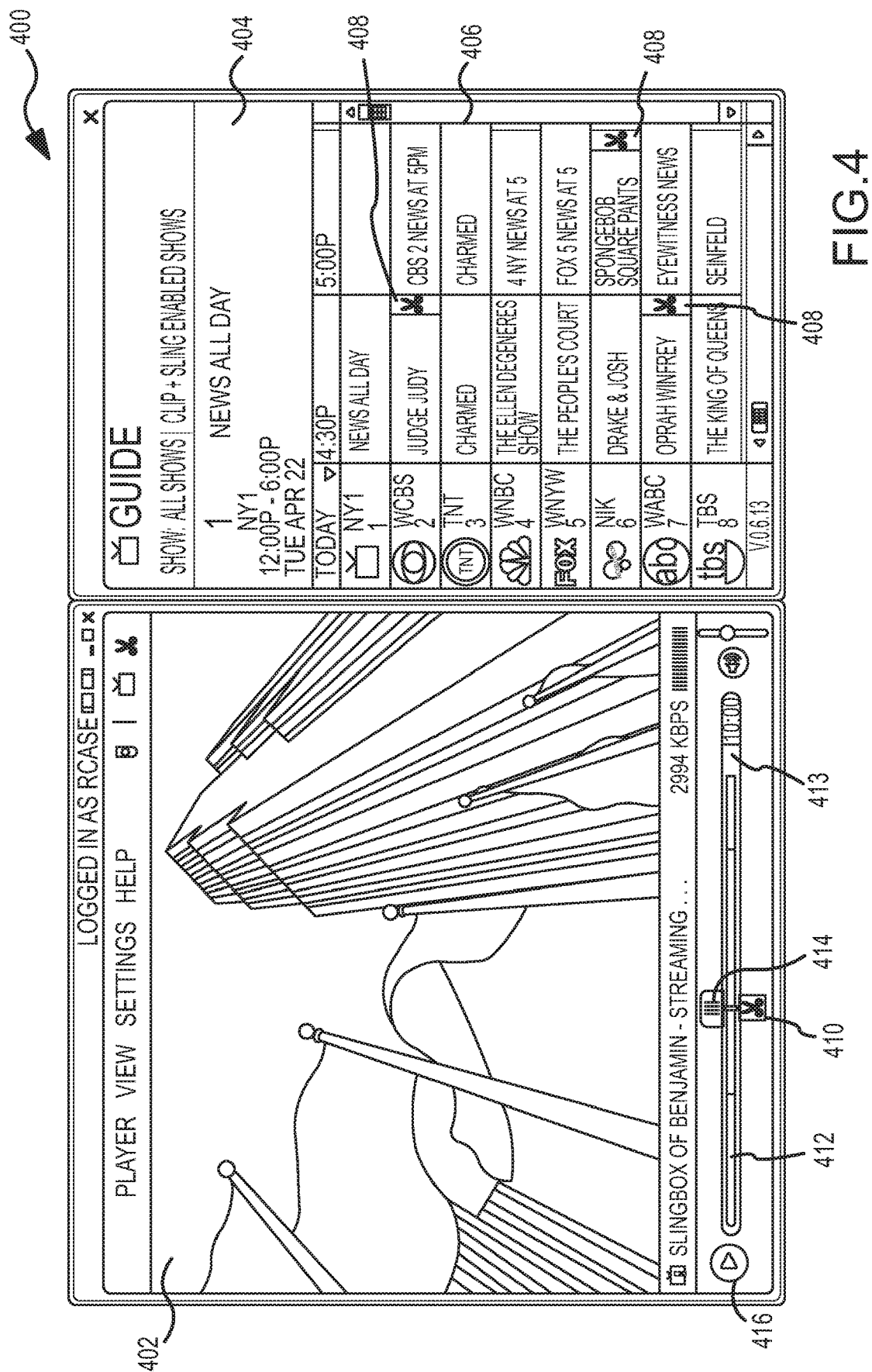
Figure 5:
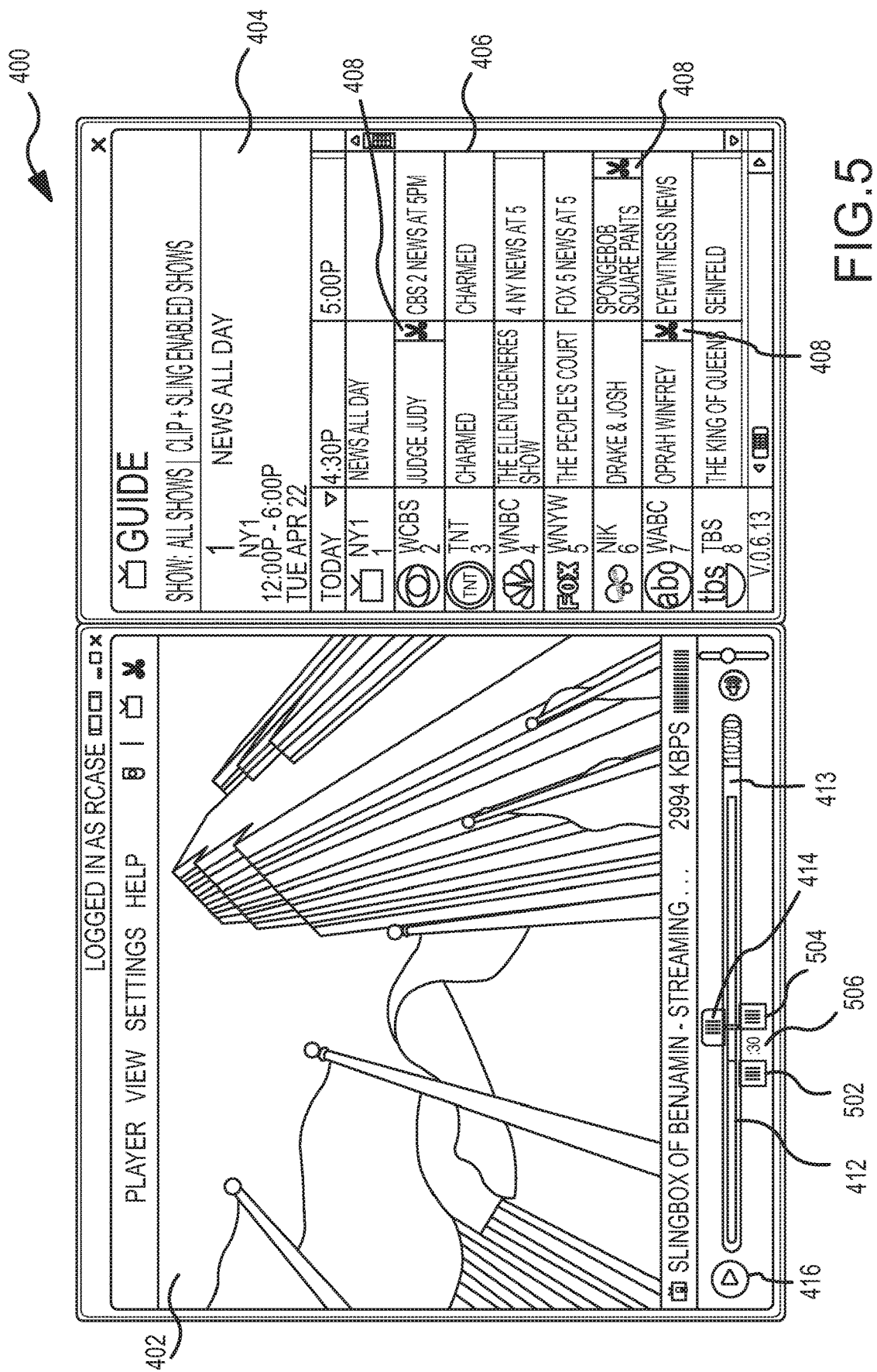

FIGS. 4-6 are views of an exemplary interface 400 for a media player application 130. Referring now to FIGS. 4-6, an exemplary media player interface 400 suitably includes a window 402 for playing the received media stream 125, a time shift buffer indicator 413 that indicates relative position of the current imagery being displayed in window 402 within the buffer. In various embodiments, buffer indicator 413 provides a line 412 that extends across a portion of indicator 413 to show the relative fullness of the buffer. Interface 400 shown in FIGS. 4-6 also includes a play button 416 to play or pause playback of video stream 125 in window 402 as appropriate. Additional interface features such as a slider control 414 may be provided to allow forward/reverse movement in time within video stream 125 along the buffer indicator 413; equivalent embodiments may provide "forward" and/or "reverse" buttons in place of slider 414 as desired.

As the program is received via video stream 125, line 412 extends to fill buffer indicator 413 as appropriate. In the embodiment shown in FIGS. 4-6, line 412 progressively fills from left to right, although other embodiments may be spatially arranged in any other manner. In some embodiments, imagery may be presented "live" as it is received in window 402 until directed otherwise by the viewer. The viewer may pause viewing (by depressing button 416, for example) or rewind viewing by moving slider 414 to the left along line 412 as shown in FIGS. 4-6. The viewer may subsequently forward back to the "live" stream as it is received by moving slider 414 to the right (in this example), or may take any other actions as desired.

The viewer may change the content presented in window 402 in any manner. In various embodiments, content is changed by changing the received media stream 125. This may be accomplished, for example, by changing the channel on a tuner (e.g., a tuner located internal or external to media player 102), by directing a remotely-located placeshifting device 112 (FIG. 1) to change the stream 125, or in any other manner. In various embodiments, an EPG feature 406 is provided as part of media player application 130. One example of an EPG feature 406 suitable for use with either a local tuner or a remote placeshifting device 112 is shown in FIGS. 4-5. As shown in the figure, EPG 406 provides information about various programs, channels and/or networks that may be obtained from any source (e.g., an external provider), and that may be stored in any location (e.g., locally within player device 102, or retrieved from a source on network 110 or elsewhere). EPG feature 406 may also provide information 404 (e.g., title, channel and/or other information) about the program currently being viewed, as desired. EPG 406 in FIGS. 4-5 allows users to graphically interact with the guide (e.g., using a cursor control device, remote control or the like) to select programs for viewing.

In the exemplary embodiment shown in FIGS. 4-5, certain programs in EPG 406 are identified as being eligible for clipping by an icon 408. Clip eligibility 408 (and any rules associated with clip eligibility) may be determined by information provided with the EPG data, and/or may be obtained by queries submitted to the CRS server (e.g., queries 222 to server 104) at a later time. Other embodiments may indicate clip eligibility using any other icon or feature; clip-eligible programs, channels or networks may be differently highlighted, shaded or colored within EPG 406, for example, or clip-eligibility may not be indicated in program guide 406 at all in some embodiments.

For programs that are clip-eligible, an icon, button or other feature 410 may be provided in interface 400 that allows the viewer to create a clip of the viewed program. When the viewer activates feature 410, interface features for identifying the beginning and end of the clip may be presented. Sliders 502 and 504 in FIG. 5, for example, show one technique for establishing the beginning and end of the clip 107. In various embodiments, player application 130 locks the sliders 502 and 504 (or other indicators) together so that they cannot be extended beyond the maximum allowable clip length, as determined in rules received for the particular program. Further, the current length of the clip and/or the maximum clip length may be displayed, e.g., as feature 506, to further assist the user in complying with the clipping rules. If the user attempts to extend the clip beyond its limits, then, media player application 130 will not allow the sliders 502, 504 (or other features) to extend beyond the limit or to otherwise allow clipping that violates one or more rules associated with the program, channel or network.

Interface 400 may reflect further limits upon clip creation, as desired. Referring now to FIG. 6, if multiple programs are stored within the time shift buffer, buffer indicator 413 may provide a divider 608 or other indication of the breaks between programs 602, 604, 606. Because each program may have its own set of clipping rules that may (or may not) be compatible with the other programs within the buffer, media application 130 stores the clipping rules for each particular program, and enforces the rules for each program separately. To that end, clips that span dividers 608 may be disallowed, and each program 602, 604, 606 may have its own maximum allowed clip length or other parameters as appropriate.

Various techniques, system and devices have therefore been described for creating variable length clips from a received media stream. As noted at the outset, rules can be defined for particular programs, channels and/or networks, and these rules can be provided to a media player so that clipping rules are enforced when the clip is created. Rules may also apply to clip distribution and/or display; such rules may be provided to the distribution server with the clip itself in various embodiments. By enforcing a maximum clip length that is specific to the program, channel or network, the rights of the content owner can be protected while still allowing flexibility in creating clips.

As used herein, the word "exemplary" means "serving as an example, instance, or illustration". "Exemplary" embodiments are not intended as models to be literally duplicated, but rather as examples that provide instances of embodiments that may be modified or altered in any way to create other embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. An automated process executable by a media player device to create a variable length clip of a particular program for redistribution by a video distribution server via a network, the method comprising:

receiving, by the media player device, a media stream that encodes the particular program via the network;

separately receiving, by the media player device, an electronic program guide that comprises identifying information about the particular program, the identifying information comprising a digital code that is associated with the particular program;

storing the received media stream in a buffer of the media player device;

transmitting the digital code associated with the particular program from the media player device via the network to a remotely-located computer server, the remotely-located computer server having access to a database of rules that are each associated with a particular one of a plurality of different programs such that the rules vary from program to program, wherein the remotely-located computer server obtains the rules associated with the particular program based upon the digital code and transmits the rules associated with the particular program to the media player device via the network;

receiving, by the media player device, the rules associated with the particular program from the remotely-located computer server via the network;

if the rules associated with the particular program from the remotely-located computer server allow user-created clips of the particular program, the media player device extracting a portion of the media stream from the buffer to thereby create the variable length clip of the particular program, wherein the extracted portion of the media stream has a start point and an end point that are based upon inputs received by the media player device from the viewer;

enforcing, by the media player device, the rules received form the remotely-located computer server upon the variable length media clip extracted from the buffer of the media player device, wherein the enforcing comprises ensuring that a duration of the variable length media clip does not exceed a maximum clip length defined by the rules associated with the particular program that were received from the remotely-located computer server, wherein the enforcing occurs at the time that the variable length clip is created by the media player device; and transmitting the extracted clip in compliance with the rules associated with the particular program from the media player device via the network for redistribution of the extracted clip on the network by the video distribution server.

2. The automated process of claim 1 wherein the automatic identifying comprises the media player device identifying the particular program encoded by the media stream without input from the viewer.

3. The automated process of claim 2 wherein the extracting is performed only after the maximum clip length is obtained from the remotely-located first computer server.

4. The automated process of claim 1 wherein the identifying information further comprises a program title and broadcast channel.

5. The automated process of claim 1 wherein the media clip provided to the remote server comprises metadata describing at least some of the rules associated with the particular program.

6. The automated process of claim 1 wherein the receiving of the media stream comprises receiving a place-shifted media stream over a network from a placeshifting device.

7. The automated process of claim 1 wherein the receiving of the media stream comprises receiving the media stream from a television source.

8. The automated process of claim 7 wherein the television source is at least one of a satellite television source, a cable television source, and a broadcast television source.

9. A media player device comprising a processor and a memory, wherein the processor is configured to execute instructions stored in the memory of the media player device to perform an automated process that creates a variable length media clip from a media stream received by the media player device via a network, the automated process comprising:

receiving the media stream via the network by the media player device and storing the media stream in a buffer of the media player device, wherein the media stream encodes a particular program;

separately receiving an electronic program guide that comprises identifying information about the particular program, the identifying information comprising a digital code that is associated with the particular program;

transmitting the digital code associated with the particular program from the media player device via the network to a remotely-located first computer server, the remotely-located computer server having access to a database of rules that are each associated with a particular one of a plurality of different programs such that the rules vary from program to program, wherein the remotely-located computer server obtains the rules associated with the particular program based upon the digital code and transmits the rules associated with the particular program to the media player device via the network;

receiving, by the media player device, the rules associated with the particular program from the remotely-located first computer server via the network;

if the rules associated with the particular program from the remotely-located computer server allow user-created clips of the particular program, the media player device extracting a portion of the decoded media stream from the buffer to thereby create the variable length clip of the particular program, wherein the extracted portion of the media stream has a start point and an end point that are based upon inputs received by the media player device from the viewer;

enforcing, by the media player device, the rules received form the remotely-located computer server upon of the variable length media clip extracted from the buffer of the media player device, wherein the enforcing comprises ensuring that a duration of the variable length media clip does not exceed a maximum clip length for the particular program defined by the rules associated with the particular program that were received from the remotely-located first computer server in response to the identifying information, wherein the enforcing occurs at the time that the variable length clip is created by the media player device; and transmitting the extracted clip in compliance with the rules associated with the particular program from the media player device via the network for redistribution of the extracted clip on the network by a video distribution server.

10. The media player device of claim 9 wherein the automatic identifying comprises the media player device identifying the particular program encoded by the media stream without input from the viewer.

11. The media player device of claim 10 wherein the extracting is performed only after the rules are obtained from the remotely-located first computer server.

12. The media player device of claim 9 wherein the identifying information further comprises a program title and broadcast network of the particular program.

* * * * *